United States Patent [19]

Sample, Jr. et al.

[11] 4,137,367

[45] Jan. 30, 1979

[54] SILANE COATED SILICATE MINERALS AND METHOD FOR PREPARING SAME

[75] Inventors: Thomas E. Sample, Jr.; John M. Horn, both of Houston, Tex.

[73] Assignee: Dresser Industries, Inc., Dallas, Tex.

[21] Appl. No.: 772,380

[22] Filed: Feb. 28, 1977

Related U.S. Application Data

[63] Continuation-in-part of Ser. No. 637,339, Dec. 3, 1975, abandoned, which is a continuation of Ser. No. 513,984, Oct. 11, 1974, abandoned.

[51] Int. Cl.$^2$ .............................................. B32B 19/08
[52] U.S. Cl. .................................... 428/443; 156/625; 427/309; 428/405; 428/447
[58] Field of Search ............... 428/447, 405, 363, 443, 428/446, 451, 454, 538, 539, 420, 324; 427/399, 220, 309, 221; 156/1, 3, 29, 25, 625

[56] References Cited

U.S. PATENT DOCUMENTS

| 3,416,953 | 12/1968 | Gutzeit | 428/446 |
| 3,979,546 | 9/1976 | Terris | 428/405 |

FOREIGN PATENT DOCUMENTS

| 566637 | 11/1958 | Canada | 427/220 |
| 4820892 | 6/1973 | Japan | 428/443 |

Primary Examiner—Stanley S. Silverman
Attorney, Agent, or Firm—Robert W. Mayer; John N. Hazelwood; Dan Rubin

[57] ABSTRACT

Phyllosilicate minerals which exhibit in their structure, sequentially, octahedral layers containing magnesium, aluminum and/or iron oxides and tetrahedral layers of silica, are superficially etched with dilute acid to remove the outer octahedral layer under controlled conditions which preserve the basic structural integrity of the mineral substance. The acid etch exposes silanol groups on the outer silicate layer of the mineral so that they become available to form silicon-to-oxygen-to-silicon-to-carbon bonds through condensation with organo-silanes. The condensation of the organo-silane with the conditioned mineral surface is accomplished by mixing the acid etched silicate mineral with the organo-silane in a suitable solvent system under mild conditions.

The organo-silane may be chosen from either of two classes: those which impart an oleophilic surface to the mineral; or those which enable the mineral surface to form additional chemical bonds with reactive sites within certain polymers and prepolymers. The mineral products of this invention which have been treated to possess oleophilic surfaces are superior additives for rheology control in lubricants, polyolefins, paints and oil well drilling fluids, as well as heat and moisture resistant reinforcing agents for rubbers; while those mineral products treated to possess surfaces chemically reactive with polymers and prepolymers when incorporated in such systems impart to the finished composites improved mechanical properties and heat and moisture resistance.

9 Claims, No Drawings

SILANE COATED SILICATE MINERALS AND METHOD FOR PREPARING SAME

RELATED APPLICATIONS

This application is a continuation-in-part of our parent application Ser. No. 637,339, filed Dec. 3, 1975, now abandoned, which in turn is a continuation of our parent application Ser. No. 513,984, filed Oct. 11, 1974, now abandoned.

BACKGROUND OF THE INVENTION

The field of the invention relates to phyllosilicate minerals such as, for example, the serpentines and micas, which exhibit in their structure, sequentially, octahedral layers containing oxides of magnesium, aluminum and/or iron, and tetrahedral layers of silicon and oxygen, which minerals have been modified for the purpose of rendering them oleophilic or imparting to them certain other desirable properties through having been coated by organo-silanes. The invention further relates to a method for conditioning said minerals to enable same to react on their surfaces with organo-silanes and to methods for effecting coatings on said minerals with organo-silanes. Minerals treated in accordance with the invention retain their basic structural integrity as evidenced by the fact that they exhibit the same X-ray diffraction pattern as do untreated minerals.

In the past, it has been recognized that certain phyllosilicate minerals possess desirable characteristics for use in plastics and elastomer compounding. In such applications, the most important active functions of these materials are reinforcement, improvement of mechanical properties, heat resistance and flow control. In addition to the above uses, certain of these minerals have found applications as additives in oil-based fluid systems, such as, for example, lubricants, paints and oil well drilling fluids for modification of flow properties. But in such applications, the unmodified minerals suffer the innate limitation of being wet by water in preference to oil so that composites incorporating them generally show impaired performance in the presence of moisture. Further, the unmodified minerals do not ordinarily interact positively with oils, plastics and elastomers forming at best only simple dispersions therein upon physical mixing without any significant chemical bond being formed between the minerals and the continuous phase. Such dispersions are usually metastable with the minerals tending to segregate from the continuous phase. It has now been discovered that by superficially coating the preconditioned surface of these minerals through chemical reaction with organo-silanes the above-noted deficiencies can be overcome.

A technique of reacting said minerals with organo-silanes has been reported in the prior art. See French Pat. No. 2,098,467 issued Feb. 14, 1972. In this prior art, the layered minerals which are made up of alternating sheets of magnesia and silica are subjected to the simultaneous action of organo-silanes in concentrated mineral acid solution. The effect of this solution on the layered mineral is to replace the magnesia layer with the organo-silanes, the process continuing throughout the entire layered mineral system. The procedure results in the elimination of most, if not all, of the magnesia layers leaving the alternating silica layers separated by layers of chemically reacted organo-silane. The reaction is an in-depth reaction controlled by the rate of diffusion of the acid and organo-silane into the body of the mineral as evidenced by the required use of a large excess of concentrated acid, long reaction periods and elevated temperatures.

The overall result of these combined reactions is that instead of a superficial acid etch, i.e., removal of the outer octahedral magnesium layer followed by surface reaction of the exposed surface silanol groups with the organo-silane, the reaction described in the prior art proceeds in depth removing most of the total magnesia (or isomorphically substituted metal) leaving an amorphous silica residue. This silica pseudomorph, which lacks crystalline structure, is friable and has, of itself, little or no mechanical strength. According to the prior art, this material is a distinct organo-mineral polymer in contrast with the superficially coated crystalline minerals of the present invention. Even in cases where only a relatively small amount of magnesia is eliminated using the prior art method organo-mineral polymer is still formed as shown by significant alteration of the X-ray diffraction pattern of the original mineral, specifically a low angle X-ray diffraction peak appears signifying the presence of alternating organo-silane-silica layers.

SUMMARY OF THE INVENTION

This invention relates to organo-silane coated phyllosilicate minerals and to methods of producing same. The products obtained from the practice of this invention may be categorized as falling within two broad end-use classes: Those which possess thermally and chemically stable oleophilic surfaces; and those which possess surfaces which are capable of forming additional chemical bonds with reactive sites within certain plastics and elastomers.

Those phyllosilicate minerals which have been rendered oleophilic according to the teachings of this invention, have been found extremely desirable additives for controlling the rheology of oil-based fluids used in oil and gas well drilling, as gelling agents in grease and paint formulating, as reinforcing agents for rubber and elastomer compounding, and as fillers for polyolefin resins and the like.

Those phyllosilicate minerals whose surfaces have been rendered, according to the teachings of this invention, capable of forming chemical bonds with reactive sites within plastics and elastomers are particularly useful for the improvement of mechanical properties, dimensional and thermal stability, and moisture resistance of finished composites based on phenolic, epoxy, acrylate and vinyl resins, as well as of both sulfur- and peroxide-cured elastomer systems.

Minerals which have been rendered oleophilic, especially chrysotile, have been found to be particularly effective in high temperature environments. Without an oleophilic character, chrysotile, because of its affinity for water, has found only restricted use in oil-thickening applications. As such systems are exposed to elevated temperatures, in the presence of moisture, chrysotile tends to become water-wet and to agglomerate or settle out of the system. By changing the surface characteristic of chrysotile to oleophilic, this material can be effectively used in oil systems to temperatures in excess of 350° F. This invention also relates to a method of preparing such surface altered minerals through a preliminary superficial acid etch of the mineral and subsequent condensation with an organo-silane.

In accordance with the present invention, the mineral is subjected to a superficial acid etch with dilute acid in order to solubilize and remove the outer octahedral layer of mixed magnesium, aluminum, or iron oxides which is characteristically present on the surface of such minerals. This reaction exposes silanol groups on the outer silicate layer so that they are free to form silicon-to-oxygen-to-silicon-to-carbon bonds through condensation with an organo-silane during a subsequent reaction step. The superficial acid etch is carried out with dilute acid, preferably a mineral acid such as hydrochloric or sulphuric acid, under conditions which maintain the basic structural integrity of the mineral body. In the case of chrysotile, this acid etch is accomplished with dilute acid and under ambient temperature conditions accompanied by mild agitation for periods up to about three hours.

The conditioned mineral is subsequently coated with the desired organo-silane by mixing these constituents together in the presence of a water miscible coupling agent such as isopropyl alcohol. This coating reaction is carried out after arresting the etching action of the acid as by adding alkali to the slurry obtained by the aforementioned acid etch or by filtering out and washing the acid etched mineral.

DETAILED DESCRIPTION OF THE INVENTION

Minerals: Phyllosilicate minerals which are suitable for modification in accordance with this invention, are selected from a class of sequentially layered minerals characterized by the presence of octahedral layers containing magnesium, aluminum and/or iron oxides and tetrahedral layers of silica. The preferred mineral is a phyllosilicate denoted as chrysotile, a common form of asbestos. While chrysotile is the preferred starting material, other phyllosilicate minerals can be used in this invention.

Silane Modifying Agent: In accordance with this invention, phyllosilicates are modified through reaction with organo-silanes. These organo-silanes are characterized by one of the two following structures:

Structure I where G is a hydroxyl group or a group hydrolyzable to hydroxyl such as, for example, alkoxy or halogen; Y is an alkyl group containing from 1 to 20 carbon atoms, a phenyl group, or an alkyl substituted phenyl group where the alkyl groups can contain a total of from 1 to 12 carbon atoms; R and R' are selected from the groups described by G and Y or hydrogen; or:

Structure II where G is a hydroxyl group or a group hydrolyzable to a hydroxyl such as, for example, alkoxy or halogen: Z is an alkyl group containing from 1 to 20 carbon atoms bearing a functional group such as, for example, amino, oxirane, mercapto or acryloxy, capable of forming chemical bonds with reactive sites within polymers and prepolymers or an allyl or vinyl group; R and R' are selected from the groups described by G and Z, hydrogen, an alkyl group containing from 1 to 20 carbon atoms, phenyl, or alkyl substituted phenyl where the alkyl groups can contain a total of from 1 to 12 carbon atoms.

In accordance with one preferred embodiment of this invention, it is desired to modify chrysotile by imparting oleophilic properties to said mineral while at the same time maintaining its basic mineral structure. It has been observed that this is accomplished most effectively by the use of organo-silanes selected from the class exemplified in Structure I, wherein Y is an alkyl chain of from 2 to 18 carbon atoms. More specifically, methyloctyldiethoxy silane has been found to be a preferred material for imparting such oleophilicity to the surface of chrysotile fibers. Methyldodecyldiethoxy silane, decyltriethoxy silane, octyltriethoxy silane and heptyltrimethoxy silane are also desirable agents for imparting oleophilic characteristics.

Further, in accordance with another embodiment of this invention, it is desired to modify chrysotile by imparting to said mineral a capability of bonding to reactive sites within the structure of certain types of polymers, copolymers, prepolymers, elastomers and resins: for resins of the phenolic epoxy and urethane types, this is effectively accomplished by coating the mineral according to the teachings of this invention with organo-silanes of the class exemplified by Structure II, wherein Z is the 3-aminopropyl group; for polymers, copolymers and elastomers based on isoprene, butadiene, butadiene-acrylonitrile or ethylene-propylene-diene, for example, this is effectively accomplished by use of organo-silanes of Structure II wherein Z is the 3-mercaptoethyl group; and for polyolefins such as, for example, those based on ethylene, propylene, isobutylene and the like or polymers based on vinyl derivatives such as, for example, vinyl acetate, methyl methacrylate, vinyl chloride, vinyl ethers and the like, again according to the teachings of this invention, this may be effected by use of organo-silanes selected from Structure II in which Z is the vinyl or allyl group.

Acid Etching of Minerals Preparatory to Coating: According to the technique of this invention, the outer octahedral layer of magnesium, aluminum and/or iron oxides must be eliminated by acid etching to have available free hydroxyl groups for reaction with alkoxy or halogen groups on the silanes. As an etching agent, it has been found that a mineral acid such as hydrochloric or sulfuric are among the most suitable, although other acids which form soluble salts of metallic oxides in the outer octahedral layer such as nitric and acetic acids can also be used.

Further, extreme conditions of reaction time and temperature are to be avoided in order to control the etching so that only the surface layer of magnesium, iron and/or aluminum compounds are removed. Thus, typically 0.3 to 0.5 parts of $H_2SO_4$ acid by weight in about 10 parts of water reacted with one part of chrysotile at a temperature of 60°–80° F. for a period of up to three hours normally produces a suitable superficial etching to enable a satisfactory bond to be formed between the organo-silane and the mineral surface without appreciably degrading the basic structural integrity of the mineral as evidenced by X-ray diffraction pattern comparison of chrysotile before and after such a typical etching treatment.

The etching operation may be carried out in conventional mixing equipment under moderate agitation. After the surface etching has been affected it is preferred that sodium or potassium hydroxide be added to raise the pH of the reaction mixture to a value in the range of 6.5–7.0. This is done to retard undesirable further etching and adjust the pH of the mixture to within a suitable range for subsequent surface reaction with the selected organo-silane.

Reacting the Conditioned Mineral with Silane: According to the preferred method of this invention, organo-silane, preferably dissolved in a suitable water miscible solvent, is added with agitation to the pH adjusted aqueous slurry of the surface acid-etched mineral.

The organo-silanes are utilized in quantities of about 0.5% to about 10% based on the weight of the surface conditioned mineral to be treated. In the specific case where the mineral is chrysotile, 3–10% silane may be used to advantage, the optimum amount being about 5%. If excess organo-silane is employed, a portion of the excess may polymerize if the silane contains two or three of the type groups as G in Structure I and II and dimerize if the silane contains one such group. This polymer or dimer may deposit on the surface of the mineral and have a deleterious effect on subsequent performance.

The organo-silanes may be added to the aqueous mineral slurry without dilution. However, particularly in the case where the organo-silane possesses limited water miscibility, it is advantageously added in the form of a solution in a water miscible coupling agent. Methyl, ethyl and isopropyl alcohols and acetone have been found to be suitable coupling agents which will disperse the silane in water giving a homogeneous mixture upon agitation, in which the silane is available for reaction with the conditioned mineral surface. Normally, about three to six times by weight of coupling agent to organo-silane is employed.

The organo-silane is added to the aqueous mineral slurry which is typically reacted for a period of about 2–16 hours at about room temperature. It has been found desirable to keep the temperature of this reaction reasonably low in order to minimize self polymerization of the organo-silanes which tends to take place in the presence of water particularly at higher concentrations and elevated temperatures.

After reaction has been completed, the mineral is separated from the aqueous phase. Organo-silane which may have been added in excess and self-polymerized may be removed if desired by washing with a suitable solvent (such as water, isopropyl alcohol or benzene). The treated mineral is then dried at about 220°–500° F. and pulverized.

According to an alternate method of this invention, the pH adjusted aqueous slurry of the surface acid-etched mineral is separated from the aqueous phase, dried at about 220°–500° F. and pulverized. The pulverized acid-etched mineral is dispersed in a non-aqueous solvent such as methanol or isopropanol or in a hydrocarbon solvent such as, for example, heptane or benzene. The organo-silane is added to the mineral slurry without dilution. The mixture is typically reacted at temperatures up to reflux for a period of about one to eight hours, after which the mineral is separated from the fluid phase. Ogano-silane which may have been added in excess and self-polymerized may be removed if desired by washing with a suitable solvent (such as hexane or acetone). The treated mineral is then dried at about 220°–500° F. and pulverized.

EXAMPLE 1

Chrysotile asbestos was treated to possess oleophilic surface properties in accordance with the present invention as follows: To a dilute solution of sulfuric acid, composed of 300 cc of water and 9 g of 98% sulfuric acid, 25 g of chrysotile, having an average fiber aspect ratio (length/diameter) of between about 200 and 1000, was added and dispersed and agitated on a Hamilton Beach mixer for about three hours at ambient temperature (70°–75° F.). To this mixture 10 cc of 50% aqueous NaOH was added to adjust the pH of the mixture to about 6.5. A solution of 2.5 g of methyloctyldiethoxy silane dissolved in 10 cc of methanol was added to the stirred mixture and stirring continued 16 hours at ambient temperature to complete the reaction. The surface reacted chrysotile was separated by filtration, washed with water, and air dried at about 230° F. for two hours. Finally, the dried product was ground for about 20–30 seconds at about 18000 rpm in a Waring blender.

EXAMPLE 2

Chrysotile asbestos was treated to impart oleophilic surface properties in accordance with the present invention as follows: To a dilute solution of sulfuric acid, composed of 3000 cc water and 90 g of 98% sulfuric acid, 300 g of chrysotile, having an average fiber aspect ratio (length/diameter) of between 200 and 1000, was added and dispersed and agitated on a Hamilton Beach mixer for about three hours at ambient temperature (70°–75° F.). To this mixture, 20 cc of 50% aqueous NaOH was added to adjust the pH of the mixture to about 6.5. A solution of 30 g of octyltriethoxysilane dissolved in 90 g of isopropanol was added to the stirred mixture with stirring continued 16 hours at ambient temperatures (70°–75° F.) to complete the reaction. The surface reacted chrysotile was separated by filtration, washed with water and air dried at about 230° F. for 16 hours and was ground for about 20–30 seconds at about 18000 rpm in a Waring blender.

EXAMPLE 3

Chrysotile asbestos was treated to impart oleophilic surface properties in accordance with the present invention as follows: To a dilute solution of hydrochloric acid, composed of 1600 cc of water and 400 cc of 37% hydrochloric acid, 200 g of chrysotile, having an average fiber aspect ratio (length/diameter) of between 200 and 1000, was added and dispersed and agitated on a Hamilton Beach mixer for about one-half hour at ambient temperature (70°–75° F.). The surface washed chrysotile was separated by filtration, washed with water and air dried at about 220° F. for about 16 hours and crushed in a mortar. To 100 cc of heptane, 20 g of the surface washed crushed chrysotile and 2 g of methyldodecyldiethoxy-silane were added. The mixture was dispersed and agitated on a magnetic stirrer for six hours at reflux. The surface reacted chrysotile was separated by filtration, washed with heptane and air dried at ambient temperature (70°–75° F.) 16 hours and at about 230° F. for 2 hours.

EXAMPLE 4

The oleophilic surfaces produced in accordance with the precedures of Examples 1, 2, and 3 were by this reaction verified by dispersing 10 g of the respective reaction products in 350 cc of a mixture of 95 parts diesel oil to 5 parts water by volume. In each case, the product formed a stable dispersion in this medium whereas untreated chrysotile asbestos fibers subjected to the same test procedure became water wet, flocculated and precipitated from the fluid.

EXAMPLE 5

The oleophilic surface properties imparted to chrysotile, according to the teachings of this invention, were evaluated as a gelling agent in an oil mud and compared to another type of conventional gelling agent used in such systems. The base mud used for this evaluation was a 17.3 #/gal oil mud taken from the Superior Oil Company, D.C. McMann #1, Gonzalez Country, Tex. To prepare this field mud for a laboratory study, the mud was passed through a 60 mesh screen and then heat aged at 375° F. rotating for 16 hours. This process thinned the system drastically making it susceptible for treatment with a gelling additive. The mud was then split into 1 bbl/eq and treated with the additives by shearing at 60 volts for 10 minutes on a Hamilton Beach mixer. Rheological properties were measured at 150° F. and then the samples were heat aged at 375° F. for 16 hours rotating. After cooling to room temperature, the samples were sheared for 10 minutes at 60 volts and the rheology remeasured at 150° F. The following is a summary of this testing:

TABLE I

| Additive | Concentration #/bbl | Aging | AV (in cps) | PV (in cps) | YP (in #/100 ft$^2$) | Gel Strength (in #/100 ft$^2$) (initial/10 min) |
| --- | --- | --- | --- | --- | --- | --- |
| Blank | 0 | Immed. | 41 | 37 | 7 | 3/4 |
|  |  | 16 hrs at 375° | 41 | 38 | 6 | 4/6 |
| Asbestos | 6 | Immed. | 72 | 65 | 14 | 5/10 |
|  |  | 16 hrs at 375° | 100 | 85 | 29 | 8/16 |
| Asbestos Coated per Ex. 1 Methyloctyldiethoxysilane | 6 | Immed. 16 hrs at 375° | 148 121 | 110 97 | 75 47 | 29/36 17/32 |
| Asbestos Coated per Ex. 2 Octyltriethoxysilane | 6 | Immed. 16 hrs at 375° | 139 145 | 106 114 | 65 59 | 27/37 18/29 |
| Organophilic Clay of the Bentone Class | 6 | Immed. 16 hrs at 375° | 70 47 | 60 44 | 20 6 | 9/8 4/7 |

These data indicate that the silane coated asbestos materials are very effective in gelling oil muds.

EXAMPLE 6

Chrysotile asbestos was treated to enable the mineral surface to form additional chemical bonds with reactive sites within resins of the phenolic, epoxy and urethane types in accordance with the present invention as follows: To a dilute solution of hydrochloric acid, composed of 2400 cc of water and 600 cc of 37% hydrochloric acid, 300 g of chrysotile, having an average fiber aspect ratio (length/diameter) of between 200 and 1000, was dispersed and agitated on a Hamilton Beach mixer for about one hour at ambient temperature (70°–75° F.). The surface washed chrysotile was separated by filtration, washed with water and air dried at about 230° F. for about 16 hours and ground for about 20–30 seconds in a Waring blender at about 18000 rpm. To 100 cc of heptane, 40 g of the surface washed ground chrysotile and 4 g of 3-aminopropyltriethoxysilane were added. The mixture was dispersed and agitated on a magnetic stirrer for four hours at reflux. The surface reacted chrysotile was separated by filtration, washed with heptane and air dried for one-half hour at about 230° F.

The fixed nitrogen content of the washed and dried product was determined by the Kjeldahl method to be 0.38% by weight. A similar analysis performed on the unreacted chrysotile asbestos showed a 0.0% nitrogen content.

EXAMPLE 7

Chrysotile asbestos was treated to enable the mineral surface to form additional chemical bonds with reactive sites within resins of the phenolic and epoxy types, in accordance with the present invention as follows: To a dilute solution of hydrochloric acid composed of 500 cc of water and 50 cc of 37% hydrochloric acid, 50 g of chrysotile having an average fiber aspect ratio (length/diameter) of between about 200 and 1000 was dispersed and then agitated on a Hamilton Beach mixer for about three hours at ambient temperature (70°–75° F.). To this mixture 5 cc of 50% aqueous sodium hydroxide was added to adjust the pH of the mixture to about 6.5. A solution of 5 g of beta-3-4-(epoxycyclohexyl) ethyltrimethoxysilane dissolved in 15 cc of isopropyl alcohol was added to the stirred mixture and stirring continued 16 hours at ambient temperature to complete the reaction. The surface reacted chrysotile was separated by filtration, washed with water and air dried at about 230° F. for 16 hours. Finally, the dried product was ground for about 30 seconds at about 18000 rpm in a Waring blender.

The fixed carbon content of the washed and dried product was determined by the combustion method to be 4.16% by weight. A similar analysis performed on the unreacted chrysotile asbestos showed a 0.21% carbon content.

EXAMPLE 8

Chrysotile asbestos was treated to enable the mineral surface to form additional chemical bonds with reactive sites within resins of the vinyl acetate, methyl methacrylate, vinyl chloride, vinyl ethers and the like, in accordance with the present invention as follows: To a dilute solution of sulfuric acid, composed of 1000 cc of water and 30 cc of 98% sulfuric acid, 100 g of chrysotile having an average fiber aspect ratio (length/diameter) of between about 200 and 1000 was dispersed and then agitated on a Hamilton Beach mixer for about three hours at ambient temperature (70–75%F.). The pH of this mixture was adjusted to 6.5 and then a solution of 10 g of methylvinyldichloro-silane dissolved in 50 cc of isopropyl alcohol was added; the pH of the mixture readjusted to 6.5 and stirring continued about 16 hours at ambient temperature to complete the reaction. The surface reacted chrysotile was separated by filtration, washed with water, methanol and air dried at about 230° F. for 16 hours. Finally, the dried product was ground for about 30 seconds at about 18000 rpm in a Waring blender.

The fixed carbon content of the washed and dried product was determined by the combustion method to be 1.1% by weight. A similar analysis performed on the unreacted chrysotile asbestos showed 0.21% carbon content.

EXAMPLE 9

The oleophilic surface properties imparted to chrysotile asbestos, according to the teachings of this invention, were demonstrated by formulating and evaluating two grease samples employing identical amounts of gelling agents, one of which was the unmodified chrysotile asbestos used to prepare the oleophilic derivative described in Example 2, and the other being the reaction product of the surface acid etched chrysotile asbestos and octyltriethoxysilane described in Example 2. Eighty-one g of the product obtained in Example 2 were milled for 5 minutes in a Waring blender at about 18000 rpm, then added to 369 g of 300 SYS mineral oil, worked to uniformity with a spatula and finally passed through a Morehouse Mill with 0.002 inch clearance. The second grease was then prepared utilizing unmodified chrysotile asbestos in an identical manner. The two grease samples were then characterized as follows:

TABLE II

| | Unworked Penetration* | Worked Penetration* | Drop Point | Resistance** |
|---|---|---|---|---|
| Grease formulated with surface reacted chrysotile | 273 | 275 | 500+° F | Passed |
| Grease formulated with unreacted chrysotile | 301 | 316 | 480° F | Failed |

*ASTM 217
**MIL-6-3278

EXAMPLE 10

The oleophilic surface properties imparted to chrysotile asbestos and further the water resistant nature of polymer matrices employing such treated mineral fibers, as taught in this invention, have been demonstrated by formulating and evaluating three nitrile elastomers employing identical amounts of reinforcing agents, one of which was the unmodified chrysotile asbestos used to prepare the oleophilic derivative described in Example 2, another being the reaction product of the surface acid etched chrysotile asbestos and octyltriethoxysilane described in Example 2, and the third being carbon black, designated as type N-326 which is commonly used as a nitrile rubber reinforcing agent. Fifty parts of the product obtained in Example 2 were milled, vulcanized and cured under standard conditions with 100 parts of nitrile rubber, and 12 parts of pasticizers, accelerators, and curing agents normally employed in such formulations. The second and third samples were prepared in a like manner utilizing unmodified chrysotile asbestos in one case and type N-326 carbon black in the other, in lieu of the silane coated asbestos product of Example 2.

These three samples were then tested for moisture resistance according to the following procedure. Tensile strips cut from cured slabs were weighed and suspended in an autoclave steam environment at 400° F. and 300 psig for 72 hours. The strips were then taken from the autoclave and surface moisture removed. The slabs were then weighed immediately to determine moisture uptake with the following results:

TABLE III

| | Moisture Gain % Based on Weight of Strip |
|---|---|
| Rubber compounded with surface reacted chrysotile of Example 2 | −1.75 |
| Rubber compounded with unreacted chrysotile | +9.2 |
| Rubber compounded with N-326 carbon black | +5.6 |

EXAMPLE 11

In order to illustrate the application of materials of this invention as reinforcing agents for various resin polymers and the ability of such materials to reduce water absorption of such filled polymers, samples were prepared as follows: 3.3 g of Shell R-15 epoxy resin were mixed with 0.5 g of reinforcing agent and 0.67 g of dipropylene triamine curing agent added. This composition was cured for 16 hours at 100° F. Water absorption tests were run according to ASTM D 570-63. The results are set forth in Table IV below:

TABLE IV

| Reinforcing Agent | % Weight Gain |
|---|---|
| Unreacted asbestos | 1.82 |
| Composition of Example 2 | 1.15 |
| Composition of Example 6 | 1.57 |
| Composition of Example 7 | 1.22 |

Similar results were obtained with a polymer compound of 8.0 g of polyester resin, 2.0 g of reinforcing agent and 0.4 g of methylethyl ketone perolide which was cured overnight. Results are shown in Table V below:

TABLE V

| Reinforcing Agent | % Weight Gain |
|---|---|
| Unreacted asbestos | 0.575 |
| Composition of Example 8 | 0.369 |

EXAMPLE 12

X-ray diffraction data was obtained for a number of compositions of this invention and for three compositions made from chrysotile asbestos in accordance with the teachings of French Pat. No. 2,098,467. A comparison of these data show that the composition of the invention has essentially the same crystalline structure as does the mineral from which it is made whereas those made in accordance with the teachings of the French patent have an altered crystalline structure apparently due to the presence of an organo-mineral structure formed internally of the mineral body.

The symbols used in the tables have the following meanings:

Peak height — arbitrary units representing intensity of diffracted radiation $2\theta$ — angle between incident and diffracted radiation in degress d — lattice spacing in Angstrom units
Peak description — characterization of substance indicated

Sample A - Untreated chrysotile asbestos

| Peak Height | 2θ | d | Peak Description |
|---|---|---|---|
| 79 | 12.1° | 7.13Å | 006 chrysotile |
| 9 | 18.6 | 4.76 | 001 brucite |
| 6 | 20.0 | 4.43 | 023 chrysotile |
| 47 | 24.4 | 3.64 | 00,12 chrysotile |
| 3 | 37.1 | 2.42 | 00,18 chrysotile |
| 1 | 50.0 | 1.82 | 00,24 chrysotile |

Sample B - $H_2SO_4$ etched asbestos prepared in accordance with the acid etching procedure described in Example 2 above but without silane treatment

| Peak Height | 2θ | d | Peak Description |
|---|---|---|---|
| 68 | 12.1° | 7.31Å | 006 chrysotile |
| 5 | 20.0 | 4.43 | 023 chrysotile |
| 34 | 24.4 | 3.64 | 00,12 chrysotile |
| 2 | 37.1 | 2.42 | 00,18 chrysotile |
| 1 | 50.0 | 1.82 | 00,24 chrysotile |

Sample C - Octyltriethoxysilane treated asbestos prepared in accordance with Example 2 above

| Peak Height | 2θ | d | Peak Description |
|---|---|---|---|
| 69 | 12.1° | 7.31Å | 006 chrysotile |
| 5 | 20.0 | 4.43 | 023 chrysotile |
| 36 | 24.4 | 3.64 | 00,12 chrysotile |
| 2 | 37.1 | 2.42 | 00,18 chrysotile |

Sample D - Octyltriethoxysilane treated asbestos prepared in accordance with Example 1 of French Patent 2,098,467 but using a different organo-silane

| Peak Height | 2θ | d | Peak Description |
|---|---|---|---|
| 13 | 4.8° | 18.4Å | organo-mineral structure |
| 3 | 12.1 | 7.31 | 006 chrysotile |

Sample E - Octyltriethoxysilane treated asbestos prepared in accordance with Example 1 of French Patent 2,098,467 except that treatment time was onlu 3 minutes resulting in removal of 3.6% of the original MgO content of the asbesots

| Peak Height | 2θ | d | Peak Description |
|---|---|---|---|
| 4 | 4.8° | 18.4Å | organo-mineral structure |
| 42 | 12.1 | 7.31 | 006 chrysotile |
| 4 | 20.0 | 4.43 | 023 chrysotile |
| 25 | 24.4 | 3.64 | 00,12 chrysotile |
| 2 | 37.0 | 2.42 | 00,18 chrysotile |

Sample F - Methylvinylsilane treated asbestos prepared in accordance with Example 2 above but using a different organo-silane

| Peak Height | 2θ | d | Peak Description |
|---|---|---|---|
| 47 | 12.1° | 7.31Å | 006 chrysotile |
| 4 | 20.0 | 4.43 | 023 chrysotile |
| 25 | 24.4 | 3.64 | 00,12 chrysotile |
| 2 | 37.1 | 2.42 | 00,18 chrysotile |

Sample G - Methylvinylsilane treated asbestos prepared in accordance with Example 1 of French Patent 2,098,467

| Peak Height | 2θ | d | Peak Description |
|---|---|---|---|
| 5 | 6.8° | 13.0Å | organo-mineral structure |
| 15 | 12.1 | 7.31 | 006 chrysotile |
| 8 | 24.4 | 3.64 | 00,12 chrysotile |

Sample H - 3-Aminopropyltriethoxysilane treated asbestos prepared in accordance with Example 8 above

| Peak Height | 2θ | d | Peak Description |
|---|---|---|---|
| 34 | 12.1° | 7.31Å | 006 chrysotile |
| 4 | 20.0 | 4.43 | 023 chrysotile |
| 22 | 24.4 | 3.64 | 00,12 chrysotile |
| 3 | 37.1 | 2.42 | 00,18 chrysotile |

Sample I - 3-Mercaptopropyltrimethoxysilane treates asbestos prepared in accordance with Example 2 above but using a different organo-silane

| Peak Height | 2θ | d | Peak Description |
|---|---|---|---|
| 28 | 12.1° | 7.31Å | 006 chrysotile |
| 4 | 20.0 | 4.43 | 023 chrysotile |
| 16 | 24.4 | 3.64 | 00,12 chrysotile |
| 3 | 37.1 | 2.42 | 00,18 chrysotile |

EXAMPLE 13

Silane coated materials made in accordance with this invention differ from those disclosed by the prior art not only in crystalline structure but also in physical properties. For example, Table VI below sets forth comparative results between material made in accordance with the invention and that made in accordance with prior art teachings when used as a gelling agent for an oil/water mixture consisting of 95%, #2 diesel oil and 5% water. This mixture was prepared by stirring the oil and water in a Waring blender for 5 minutes at 18000 rpm. The results set forth below are for tests run in accordance with the procedure described in Example 5 above.

TABLE VI

| Additive | Concentration #/bbl | Aging | AV (in cps) | PV (in cps) | YP (in#/100 ft$^2$) | Gel Strength (in #/100 ft$^2$) (initial/10 min) |
|---|---|---|---|---|---|---|
| Asbestos prepared as in Example 12, Sample C (this invention) | 1 | Immed. | 28 | 12 | 32 | 15/17 |
| Asbestos prepared as in Example 12, Sample E (prior art) | 1 | Immed. | 12.5 | 9 | 7 | 3/5 |

Thus, it can be seen that the composition of the invention differs from that of the prior art not only in crystalline structure but also in its ability to improve the rheological properties of mixtures of the type encountered in oil well drilling.

The embodiment of the invention in which an exclusive property or privilege is claimed are defined as follows:

1. A composition of matter consisting of chrysotile asbestos mineral having an exposed silica layer chemically bonded to an outer layer of organo-silane with the underlying octahedral oxide layers essentially intact.

2. The composition of matter according to claim 1 wherein said organo-silane is methyloctyldiethyoxy silane.

3. The composition of matter according to claim 1 wherein said chemically bonded outer layer of organo silane is derived from a compound having the following generalized structural formula:

wherein
G is selected from the group consisting of a hydroxyl group and a group hydrolyzable to hydroxyl;
Y is selected from the group consisting of an alkyl group containing from 1 to 20 carbon atoms, a phenyl group and an alkyl substituted phenyl group wherein the alkyl groups contain a total of from 1 to 12 carbon atoms; and
R and R' are selected from the group consisting of G, Y and hydrogen.

4. The composition of matter according to claim 1 wherein said chemically bonded outer layer of organo-silane is derived from compound having the following generalized structural formula:

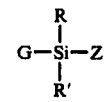

wherein
G is selected from the group consisting of a hydroxyl group and a group hydrolyzable to hydroxyl;
Z is selected from the group consisting of an alkyl group containing from 1 to 20 carbon atoms and bearing a functional group capable of forming chemical bonds with reactive sites within polymers and prepolymers, an alkyl group and a vinyl group; and
R and R' are selected from the group consisting of G, Z, hydrogen, an alkyl group containing from 1 to 20 carbon atoms, a phenyl group and an alkyl substituted phenyl group wherein the alkyl groups contain a total of from 1 to 20 carbon atoms.

5. The composition of matter according to claim 1 wherein said organo-silane is octyltriethoxysilane.

6. The composition of matter according to claim 1 wherein said organo-silane is methyldodecyldiexthoxysilane.

7. The composition of matter according to claim 1 wherein said organo-silane is 3-aminopropyltriethoxysilane.

8. The composition of matter according to claim 1 wherein said organo-silane is beta-3-4-(epoxycyclohexyl) ethyltrimethoxysilane.

9. The composition of matter according to claim 1 wherein said organo-silane is methylvinyldichlorosilane.

* * * * *